(12) United States Patent
Sturgis et al.

(10) Patent No.: US 7,002,738 B2
(45) Date of Patent: Feb. 21, 2006

(54) STEREOMICROSCOPE WITH A CO-OBSERVER TUBE

(75) Inventors: Max Sturgis, Park City, UT (US); Ulrich Sander, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 13 days.

(21) Appl. No.: 10/793,440

(22) Filed: Mar. 4, 2004

(65) Prior Publication Data
US 2004/0252371 A1 Dec. 16, 2004

Related U.S. Application Data

(60) Provisional application No. 60/478,394, filed on Jun. 13, 2003.

(51) Int. Cl.
*G02B 21/00* (2006.01)
*G02B 21/18* (2006.01)

(52) U.S. Cl. .................. 359/384; 359/368; 359/372
(58) Field of Classification Search ......... 359/368–390
See application file for complete search history.

(56) References Cited

U.S. PATENT DOCUMENTS

| | | | | |
|---|---|---|---|---|
| 5,173,803 A | * | 12/1992 | Heller | 359/384 |
| 5,528,426 A | | 6/1996 | Howes | 359/629 |
| 5,552,929 A | | 9/1996 | Fukaya et al. | 359/380 |
| 5,668,661 A | * | 9/1997 | Tomioka | 359/380 |
| 5,907,432 A | * | 5/1999 | Hayasaka | 359/384 |
| 6,473,229 B1 | * | 10/2002 | Nakamura | 359/377 |
| 6,525,878 B1 | * | 2/2003 | Takahashi | 359/466 |
| 6,661,572 B1 | * | 12/2003 | Spink et al. | 359/372 |

OTHER PUBLICATIONS

"The Leica MS1 Surgical Microscope System", Leica Microsystems Ltd., CH-9435 Heerbrugg (Switzerland), 2002, Publication No. in: English 10 M1 500 Den/A.

* cited by examiner

*Primary Examiner*—Thong Q Nguyen
(74) *Attorney, Agent, or Firm*—Davidson, Davidson & Kappel, LLC

(57) ABSTRACT

A stereomicroscope includes a binocular tube for a pair of main stereo beam paths and an assistant's tube for an assistant's beam path. The assistant's tube can swivel about an axis of the assistant's beam path in a plane parallel to the main stereo beam paths. One or more optical beam splitters divert the assistant's beam path to the assistant's tube via the back of the housing of the stereomicroscope.

15 Claims, 7 Drawing Sheets

STEREOMICROSCOPE WITH A CO-OBSERVER TUBE

Priority is claimed to application Ser. No. 60/478,394, filed Jun. 13, 2003, the subject matter of which is hereby incorporated by reference herein.

The invention relates to a stereomicroscope equipped with a monoscopic or conditionally stereoscopic co-observer tube (assistant's tube).

BACKGROUND

Stereomicroscopes equipped with a monoscopic or conditionally stereoscopic co-observer tube (assistant's tube) are well-known and have meanwhile become indispensable in ophthalmic surgery and neurosurgery. However, depending on the surgeon's requirements or on the space available or on the site of the patient's surgery, it is desirable for the assistant to stand either at the left-hand side or at the right-hand side of the microscope. The state of the art pertaining to suitable monoscopic or conditionally stereoscopic assistant's tubes is that an optical beam splitter is employed to laterally divert an assistant's beam path from the left-hand or right-hand main beam path. With the existing solutions, only under certain limiting preconditions can the wish be fulfilled of being able to position the assistant to the left-hand or to the right-hand side as desired.

If the stereomicroscope is configured so as to divert an assistant's beam path from a main beam path on only one side, then an appropriate stereomicroscope with a left-hand or right-hand side assistant's tube would have to be selected. However, the latter selection option between two different stereomicroscopes is often not available so that in such a case, this wish could not be fulfilled at all, or else only by turning to a more costly duplicate solution.

If the stereomicroscope can divert an assistant's beam path from the left-hand as well as from the right-hand side main beam path but, at the same time, is only equipped with one assistant's tube, then said tube would have to be removed from one side and mounted onto the other side; see, for example, Leica's brochure titled "The Leica MS1—Surgical Microscope System", Document No.: English 10 M1 500 Oen/A, II.2002, February 2002. Drawbacks here are not only the mounting itself but also the risk of sterility problems.

If the stereomicroscope is equipped with an assistant's tube on both sides, then the wish of being able to position the assistant either on the right-hand or on the left-hand side as desired could, of course, be optimally fulfilled. However, due to weight and cost considerations, fitting a stereomicroscope with two fixed assistant's tubes instead of with one swinging tube would not be advantageous either.

The disadvantage of having to remove the assistant's tube from one side and having to subsequently mount it on the other side or else the disadvantage of having to install two assistant's tubes on both sides can be overcome by solutions that entail a swinging capability in a horizontal plane. The term horizontal plane in the case at hand refers to a plane that runs at least approximately perpendicular to the main stereo beam paths. These solutions, however, all fall within the realm of complex measures to provide stereoscopic viewing for assistants. They are only feasible in those cases where the stereomicroscope is not only equipped with two main stereo beam paths but also with two additional assistant's main beam paths that run in parallel, in other words, equipped with a four-beam microscope set-up.

However, in addition to the technical complexity, this solution entailing a swinging capability still has the disadvantage that the surgeon's tube is in the way and the assistant's tube can only be swung around once the surgeon's tube has been removed or at least folded away.

Another drawback is that any data that is reflected into one of the two main stereo beam paths also has to be correspondingly reflected into one of the two assistant's beam paths.

Also in the case of monoscopic and conditionally stereoscopic solutions, when it comes to reflecting in data for the assistant, it remains disadvantageous that such data can only be reflected into the main stereo beam path from which the assistant's beam path is also diverted. With these solutions, when the position of the assistant is changed from one side to the other, this is likewise always associated with a change of the main stereo beam path. However, in order to continue to provide the assistant with the reflected-in data—at times, it is precisely the assistant who is supposed to be responsible for observing this data—the surgeon would consequently have to change the reflecting in of the data from one main stereo beam path to the other one. This situation, however, might not be desirable for the surgeon since she/he no longer has the option of providing her/his dominant eye with the reflected-in data or of leaving the dominant eye free. Moreover, the surgical microscope would then have to be fitted with a means to change the reflecting in from one main stereo beam path to the other one, or else the means for reflecting in would have to be removed so that it could then be mounted onto the desired side.

SUMMARY OF THE INVENTION

Therefore, an objective of the present invention is to provide a monoscopic or conditionally stereoscopic co-observer tube that can be positioned at various places—especially at opposite sides—on the microscope body as desired without involving a time-consuming and awkward mounting procedure and without additional re-adjustment measures, and that does not have the disadvantages encountered with similar prior-art solutions.

The present invention provides a stereomicroscope including a binocular tube configured for a pair of main stereo beam paths. At least one assistant's tube configured for at least one assistant's beam path is also provided. The assistant's tube is capable of swiveling about an axis of the at least one assistant's beam path in a plane parallel to the main stereo beam paths. At least one optical beam splitter is provided and configured to divert the at least one assistant's beam path to the at least one assistant's tube via a back of a housing of the stereomicroscope.

According to the present invention, the assistant's beam path by an additional 90° (in other words, 180° away from the surgeon) and by having a prism arrangement that can be swiveled around the axis of this assistant's beam path and by simultaneously having an assistant's binocular tube that can rotate, it becomes possible to swing the entire assistant's tube from the right-hand side to the left-hand side of the microscope body.

According to the present invention, the assistant's beam path is not diverted laterally from the appertaining main beam path, but rather, towards the back, that is to say, like before, by 90° from the axis of the main beam path, but then in terms of the direction, it is diverted not only by 90° laterally to the right-hand or left-hand side of the surgeon, but rather by 180° in the direction opposite from the surgeon.

In an embodiment, the assistant's tube is arranged on a port in a parallel plane to the main stereo beam paths so as to rotate. This arrangement of the tube allows it to swing to lateral positions that the assistant can take as desired. In another embodiment, when the assistant's tube is swung out, for example, to the left-hand side, a counterweight automatically swings out to the right-hand side. This measure prevents the microscope body, which is in a state of equilibrium, from becoming unbalanced when the assistant's tube is swung to one side.

In an embodiment, the assistant's binocular tube is rotatable so that, after the tube has been swung from one side to the other, it can be rotated into an upright position as desired.

In another embodiment, a swiveling optical beam splitter is provided that diverts the assistant's beam path both laterally as has been done so far (state of the art), as well as in the new direction towards the back (present invention). If both main beam paths of the stereomicroscope are fitted with such a swiveling optical beam splitter, the result is more variation options owing to the four (two according to the state-of-the-art arrangement and two according to the new arrangement) different places (ports) for an assistant's tube—without even counting the swinging capability of the assistant's tube itself.

In yet another embodiment, the assistant's beam path is directed by means of two deflection elements to a port that lies in the middle of the microscope body. The middle of the microscope body corresponds to the mid-point between the main stereo beam paths. This arrangement entails the advantage that the assistant's tube reaches lateral positions that are equidistant (symmetrical).

In order to ensure a selection of the main stereo beam path that provides the assistant's tube with an image, it is also proposed to have a switchable configuration of the deflection element that directs the assistant's beam path to the above-mentioned middle port. Thus, in one of the switching positions, this deflection element provides the image to the assistant's tube, which is positioned in the middle, from the left-hand main stereo beam path while in the other switching position, it provides the image to the assistant's tube from the right-hand main stereo beam path. In this manner, the assistant—irrespective of which main stereo beam path (left-dominant or right-dominant eye) the surgeon prefers for the reflected-in data—can be provided with the right-hand or with the left-hand main stereo beam path. This means that, as an advantage of this solution, the reflected-in data is available to the assistant at all times.

Moreover, in an embodiment the assistant's tube can slide along a sliding rail located on the back of the microscope body so as to reach one of the following three conceivable "docking sites" (ports):

One of the two ports corresponding to the novel approach of diverting the assistant's beam path offset by 90°. It is new that they are situated on the back of the microscope body although they are not positioned in the middle and thus do not result in equidistant swinging positions of the assistant's tube.

The port that is situated in the middle of the back of the microscope body, providing symmetrical swinging positions of the assistant's tube.

Another embodiment with a semi-circular sliding rail also incorporates the two lateral ports according to the state of the art. Additional embodiments of the invention are shown in the figures as well as in the description and in the subordinate claims.

BRIEF DESCRIPTION OF THE DRAWINGS

The invention will be elaborated upon below based on exemplary embodiments with reference to drawings.

The figures are described in an interrelated and combined manner. Identical reference numerals designate identical components; reference numerals with differing indices indicate components having the same or similar functions.

In the drawings, the following is shown:

Figure 1:
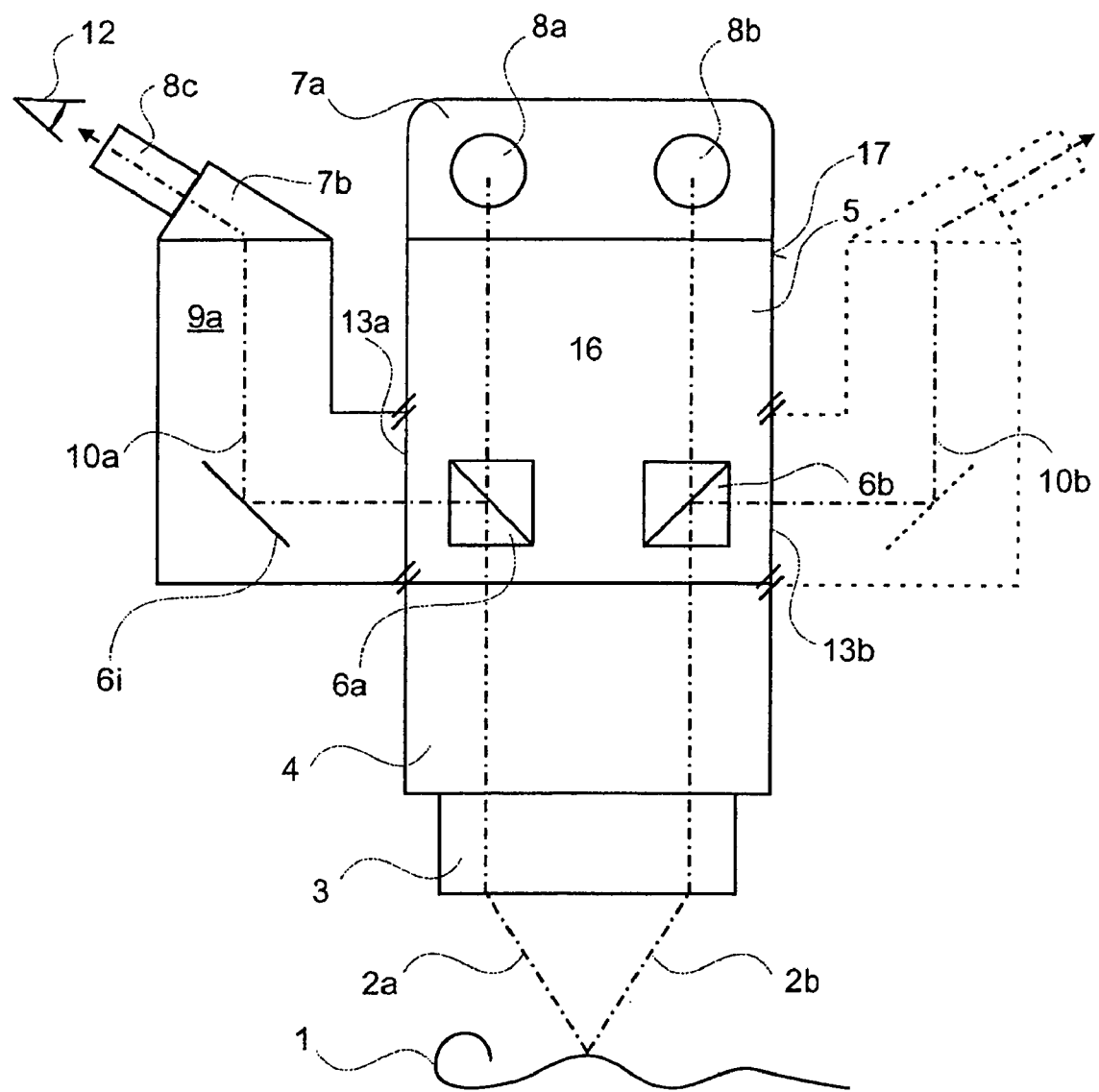
Figure 2:
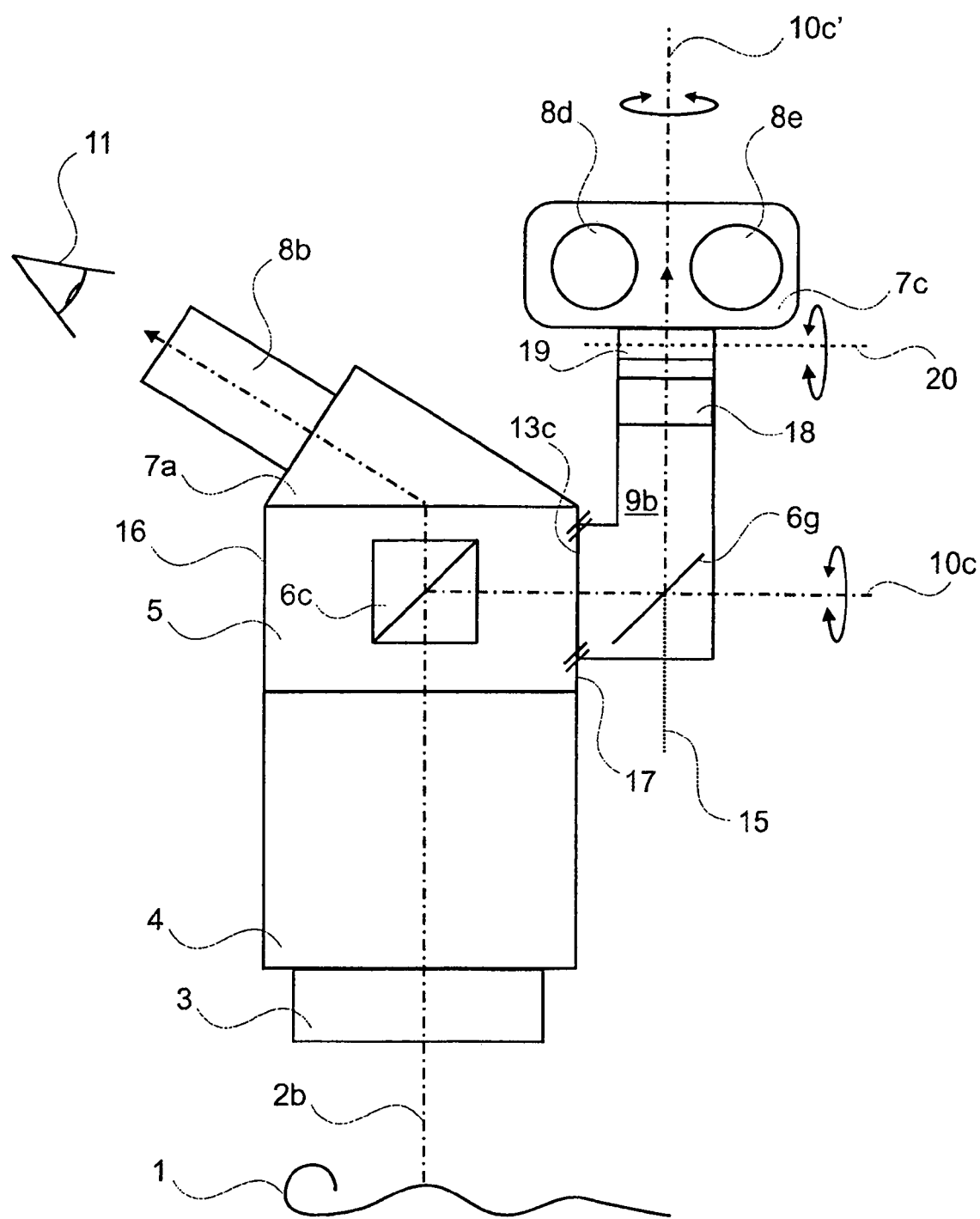
Figure 3:
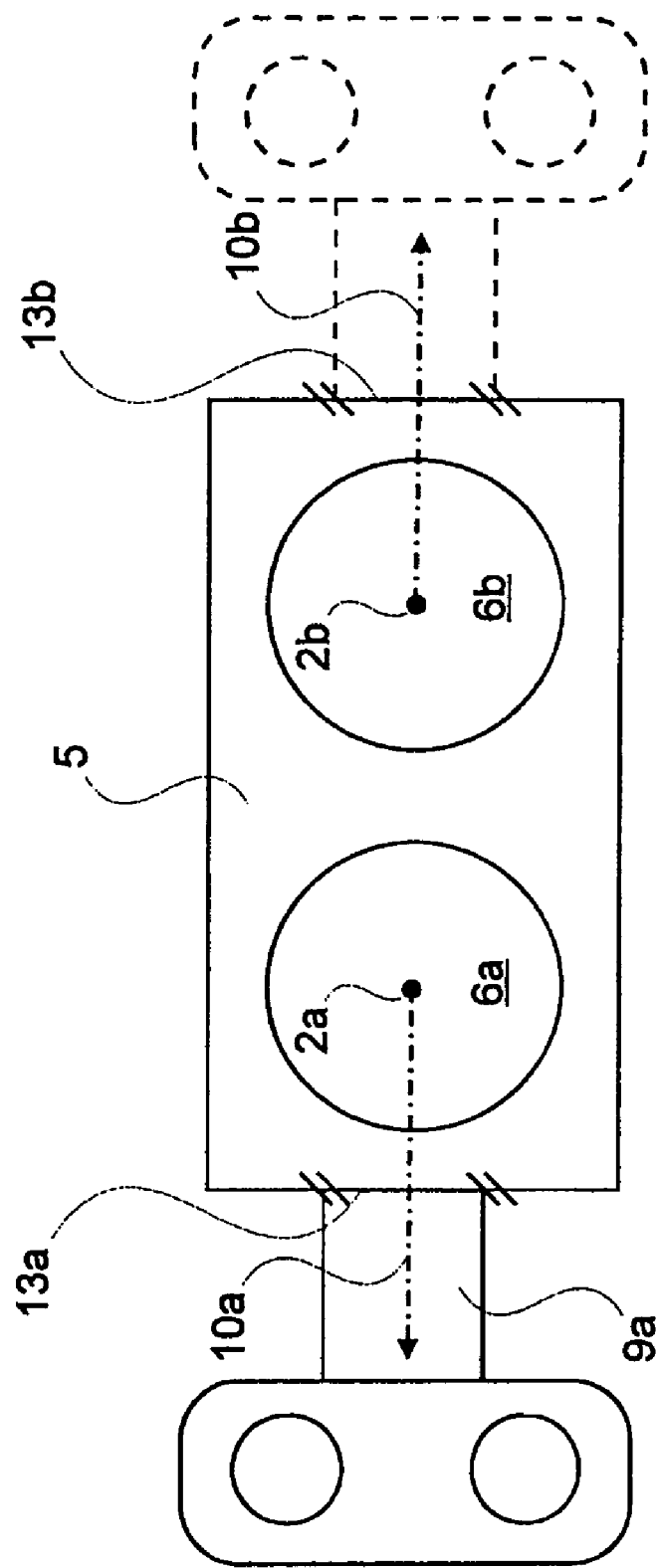
Figure 4:
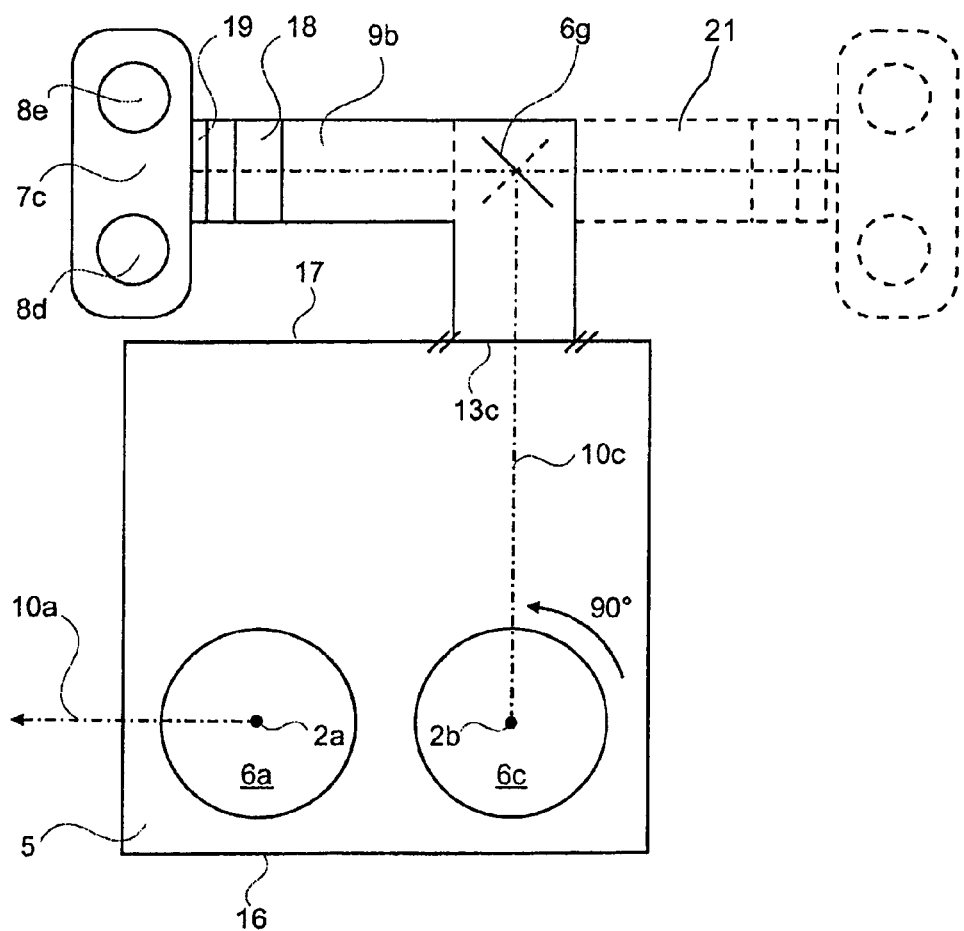
Figure 5:
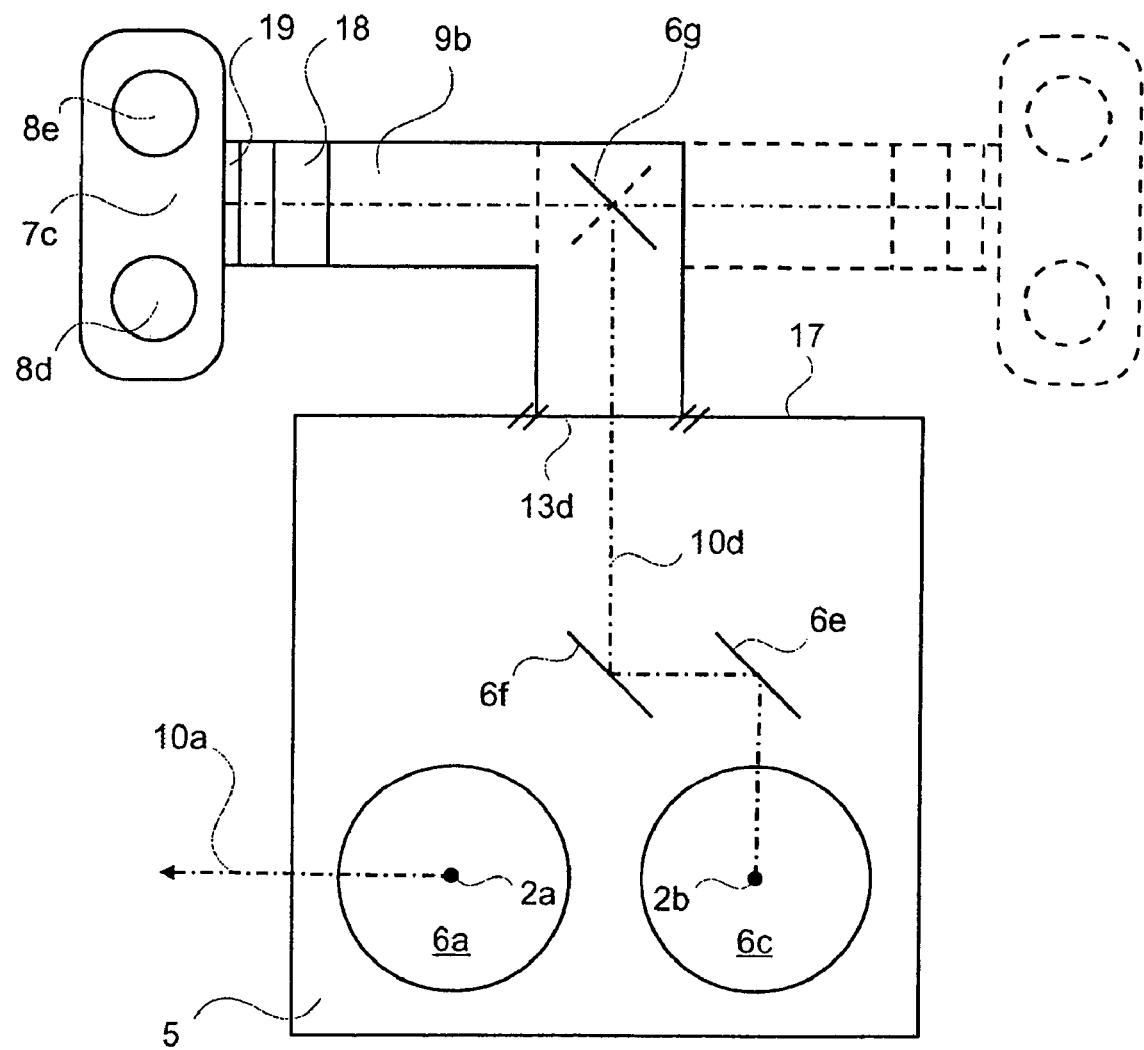
Figure 6:
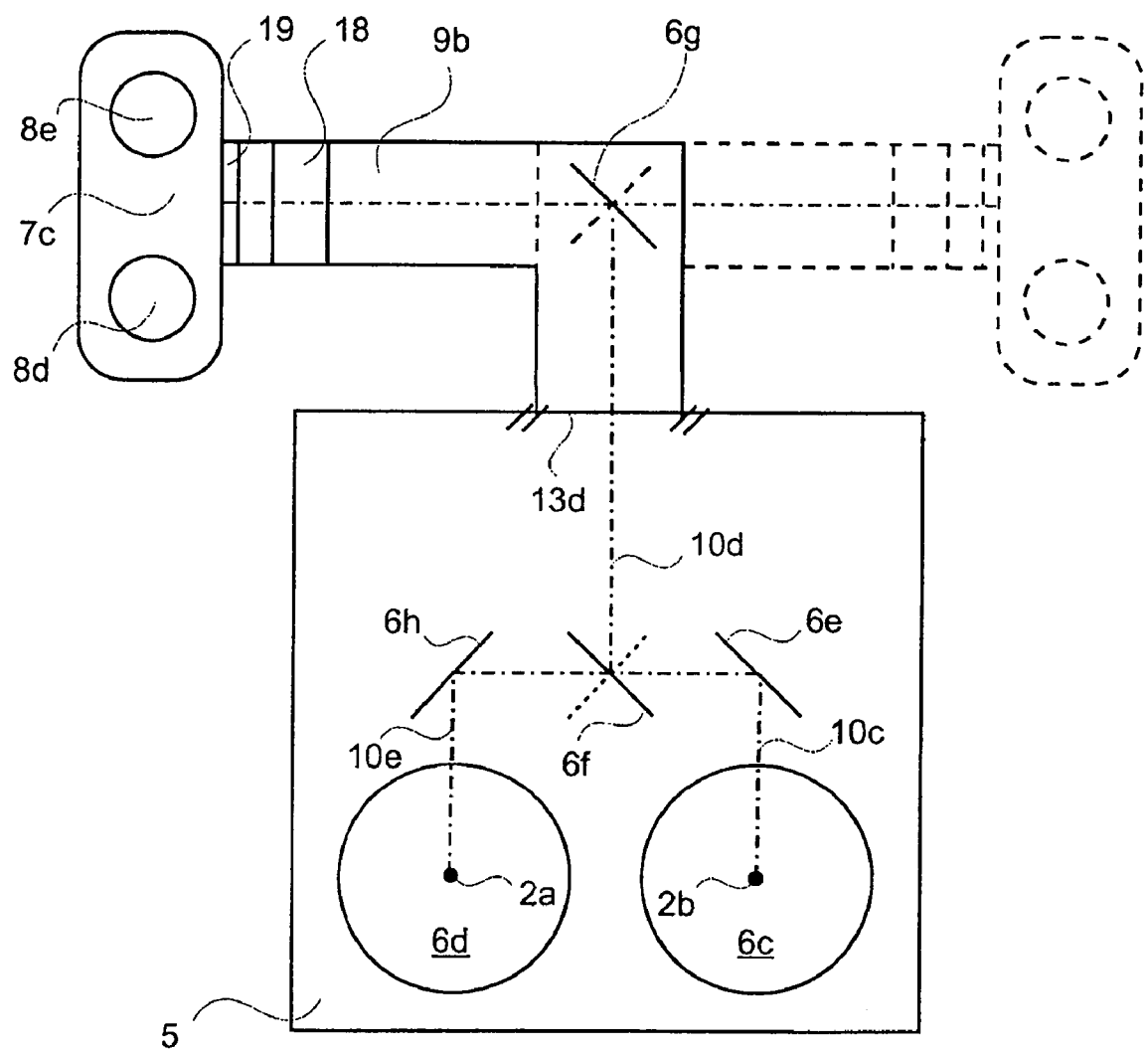
Figure 7:
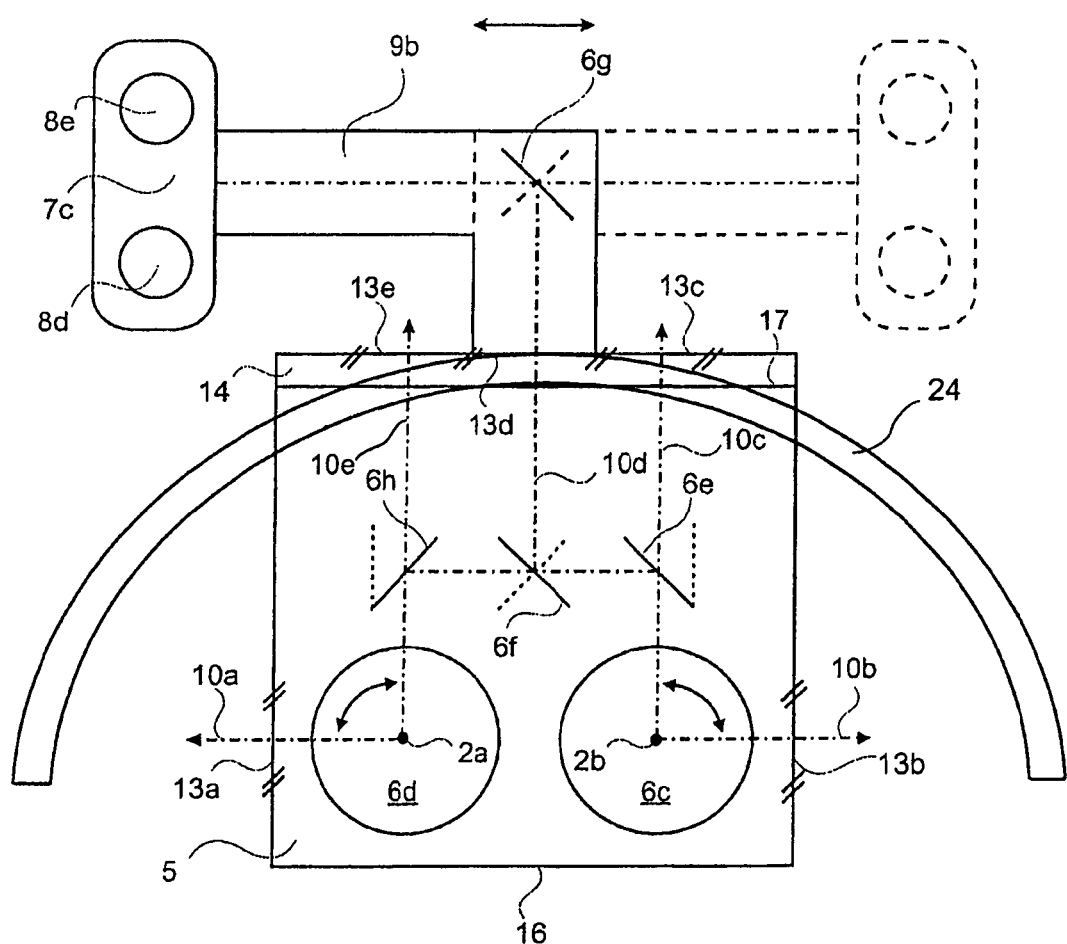

FIG. 1—a schematic set-up of a stereo microscope according to the prior art, with an assistant's tube that can be mounted onto one side or on the other side;

FIG. 2—a schematic set-up according to the invention of a stereo microscope, with an assistant's tube that can be swung into a rear parallel plane with respect to the main stereo beam paths;

FIG. 3—in a sectional view perpendicular to the main stereo beam paths, the housing of the optical beam splitter, with a lateral diversion of the assistant's beam path according to the prior art;

FIG. 4—a diversion according to the invention of the assistant's beam path offset by 90° relative to the conventional diversion, with the swingable assistant's tube according to the invention, in a schematic top view;

FIG. 5—a deflection according to the invention of the assistant's beam path into a position in which the optical beam splitter is in the middle of the housing;

FIG. 6—a deflection of both main stereo beam paths to the middle port and a switchable deflection element located in-between; and FIG. 7—a multifunctional arrangement in which the assistant's tube, according to the invention, it is arranged so as to slide between the novel ports, or may be arranged at lateral ports according to the state of the art, as desired.

DETAILED DESCRIPTION

FIG. 1 schematically shows a front view of the set-up of a stereomicroscope according to the prior art. The stereomicroscope has two main stereo beam paths 2a and 2b, a main objective lens 3 that is held above the object or patient 1, a microscope body 4 and a binocular tube 7a with eyepieces 8a and 8b. The front 16 of the housing 5 faces the observer, while the side 17 is the back situated on the opposite side. In the housing 5, there are two optical beam splitters 6a and 6b that divert an assistant's beam path 10a or 10b laterally out of the housing 5 from the appertaining main stereo beam path 2a or 2b, respectively. The assistant's beam path 10a is deflected by means of the deflection element 6i inside the assistant's tube 9a towards the binocular tube 7b, from where it is reflected into the eyepieces, of which only eyepiece 8c can be seen in this side view (of the assistant's tube). The observing assistant is symbolically represented by the eye 12. Now, when it is desired to have the assistant's tube 9a in the right-hand position (broken-line contour) instead of in the left-hand position (solid-line contour), the assistant's tube 9a has to be removed from the port 13a and mounted onto the port 13b.

FIG. 2 shows a stereomicroscope according to the invention in a side view as seen from the right-hand side. The housing 5 has a front 16 and a back 17. This side view only shows the right-hand main stereo beam path 2b for the surgeon's right eye 11. The optical beam splitter 6c is arranged in such a way that the assistant's beam path (depicted in the form of its axis 10c) is no longer diverted to the side, but rather through a port 13c in the back 17 of the housing 5. An assistant's tube 9b is attached to the port 13c in a parallel plane 15 with respect to the main stereo beam paths 2a and 2b in such a way that it can swivel around the axis 10c. A deflection element 6g integrated into the assistant's tube guides the assistant's beam path (depicted in the form of its axis 10c before the deflection and 10c' after the deflection) through an image-erecting prism 18 into a binocular tube 7c fitted with the eyepieces 8d and 8e. The binocular tube 7c is arranged on an articulated joint 19 in such a manner that it can swivel around the axis 20 but can also rotate around the axis 10c'.

FIG. 3 is a schematic top view showing how the optical beam splitters 6a and 6b in the devices known from the prior art divert the main stereo beam paths 2a or 2b to the sides of the housing 5 through appertaining ports 13a or 13b, either to the left-hand position (solid contour) or to the right-hand position (broken line contour) of the conventional assistant's tube 9a.

FIG. 4, in contrast, schematically shows that, since the optical beam splitter 6c can be swung by 90°, an assistant's beam path 10c can be diverted from the main stereo beam path 2b in a novel manner. The assistant's beam path 10c is conveyed to a port 13c located on the back 17 of the housing 5. The diversion of the assistant's beam path 10a from the main stereo beam path 2a is shown in its unchanged state with respect to the state of the art. As a result of the fact that the assistant's tube 9b is attached to the port 13c so as to swing, the assistant can take a position on the left-hand side (solid contour) or on the right-hand side (broken-line contour). According to another inventive aspect, however, the broken-line contour also schematically depicts a counterweight 21 that can swing out and that automatically compensates for an unbalance of the microscope body caused by the assistant's tube as it swings from one side to the other side.

FIG. 5 schematically shows an arrangement whose aim is to permit a left-hand side position and a right-hand side position for the assistant by means of a port 13d situated in the middle of the back 17 of the housing 5 by swinging the assistant's tube 9b, said positions being equidistant from the housing 5 or from the microscope body. This is achieved by means of a pair of deflection elements 6e and 6f. This set-up ensures absolute symmetry with respect to the main binocular tube.

FIG. 6 schematically shows an arrangement in which the assistant's beam paths 10e and 10c are directed to the middle port 13d out of the two main stereo beam paths 2a and 2b by means of swiveling optical beam splitters 6c and 6d and deflection elements 6e and 6f or 6h and 6f. The assistant is provided with the assistant's beam path 10d which stems from the main stereo beam path 2a or 2b as desired, since the deflection element 6f is configured so as to be switchable. With this set-up, the assistant has the option to chose between a main stereo beam path 2a or 2b and thus also optimally to see the contents of each of these beam paths (for instance, with or without reflected-in data).

FIG. 7 shows conceivable ports 13c, 13d, 13e which, as a novel feature according to the invention, are located on the back 17 of the housing 5 as well as those ports 13a, 13bthat, according to the state of the art, divert the assistant's beam path to the side. With this embodiment, the optical beam splitters 6c and 6d can be switched by 90° while the deflection elements 6e, 6f and 6h can be switched and/or swiveled. Accordingly, each port 13a–e can be provided with an assistant's beam path 10a–e as desired. The assistant's tube 9b can be slid back and forth on a sliding rail 14 between the ports 13c–e as desired. A variant incorporates the lateral ports 13a and 13b by means of a semi-circular sliding rail 24. Naturally, with this latter variant, the swiveling capability of the deflection elements 6d and 6c has to be radially adapted accordingly.

LIST OF REFERENCE NUMERALS

1—object or patient
2a, b—axes of the main beam paths of the stereomicroscope
3—main objective lens
4—microscope body
5—housing for optical beam splitter
6a–d—optical beam splitter
6e–i—deflection element
7a–c—binocular tube
8a–e—eyepiece
9a,b—assistant's tube or co-observer tube
10a–c, c', d, e—axes of the assistant's beam paths
11—surgeon's eye
12—assistant's eye
13a–e—port
14—sliding rail
15—parallel plane to 2a, b
16—front of 5
17—back of 5
18—image-erecting prism
19—articulated joint
20—rotational axis of 19

What is claimed is:

1. A stereomicroscope comprising:
  a binocular tube for a pair of main stereo beam paths;
  at least one assistant's tube for at least one assistant's beam path, the assistant's tube being capable of swiveling about an axis of the at least one assistant's beam path in a plane parallel to the main stereo beam paths;
  at least one optical beam splitter configured to divert the at least one assistant's beam path to the at least one assistant's tube via a back of a housing of the stereomicroscope; and
  a counterweight configured to automatically swing in an opposite swiveling direction to a swiveling direction of the at least one assistant's tube.

2. The stereomicroscope as recited in claim 1 wherein the at least one optical beam splitter is capable of swiveling by 90°.

3. The stereomicroscope as recited in claim 1 wherein the at least one assistant's tube is detachably arranged on a port.

4. A stereomicroscope comprising:
  a binocular tube for a pair of main stereo beam paths;
  at least one assistant's tube for at least one assistant's beam path, the assistant's tube being capable of swiveling about an axis of the at least one assistant's beam path in a plane parallel to the main stereo beam paths;
  at least one optical beam splitter configured to divert the at least one assistant's beam path to the at least one assistant's tube via a back of a housing of the stereomicroscope; and
  a binocular tube disposed on the assistant's tube at an articulated joint so as to be swivelable by about 180° about a second axis of the at least one assistant's beam path and so as to be swivelable about an axis of the articulated joint, the axis of the articulated joint being perpendicular to the second axis of the at least one assistant's beam path.

5. The stereomicroscope as recited in claim 4 wherein the at least one optical beam splitter is capable of swiveling by 90°.

6. The stereomicroscope as recited in claim 4 wherein the at least one assistant's tube is detachably arranged on a port.

7. A stereomicroscope comprising:
a binocular tube for a pair of main stereo beam paths;
at least one assistant's tube for at least one assistant's beam path, the assistant's tube being capable of swiveling about an axis of the at least one assistant's beam path in a plane parallel to the main stereo beam paths;
at least one optical beam splitter configured to divert the at least one assistant's beam path to the at least one assistant's tube via a back of a housing of the stereomicroscope; and
a first and a second deflection element configured to connect the at least one assistant's beam path to a first port disposed on a middle portion of the housing.

8. The stereomicroscope as recited in claim 7 wherein the at least one assistant's beam path includes a first assistant's beam path from a first main stereo beam path and a second assistant's beam path from a second main stereo beam path, and further comprising a third deflection element selectably switchable between the first and second assistant's beam paths so as to direct a selected one of the first and second assistant's beam paths to the first port.

9. The stereomicroscope as recited in claim 8 wherein:
the at least one optical beam splitter is configured to selectably direct the first beam path to the first deflection element and a second port disposed on a side of the housing; and
the first deflection element is configured to selectably direct the first assistant's beam path to a third port disposed offset on the back of the housing and, with the third deflection element, the first port.

10. The stereomicroscope as recited in claim 8 wherein:
the at least one optical beam splitter is configured to selectably direct the second beam path to the second deflection element and a fourth port disposed on a side of the housing; and
the second deflection element is configured to selectably direct the second assistant's beam path to a fifth port disposed offset on the back of the housing and, with the third deflection element, the first port.

11. The stereomicroscope as recited in claim 8 wherein:
the at least one optical beam splitter includes a first and a second optical beam splitter each swivelable by at least 90°;
the third deflection element is swivelable by at least 90°; and
the first and second deflection elements are each swivelable by at least 45°.

12. The stereomicroscope as recited in claim 8 wherein:
the first deflection element is configured to selectably direct the first assistant's beam path to a third port disposed offset on the back of the housing and, with the third deflection element, the first port;
the second deflection element is configured to selectably direct the second assistant's beam path to a fifth port disposed offset on the back of the housing and, with the third deflection element, the first port; and
the at least one assistant's tube is configured to slide along a sliding rail between the first, third and fifth ports.

13. The stereomicroscope as recited in claim 8 wherein:
a first beam splitter of the at least one optical beam splitter is configured to selectably direct the first beam path to the first deflection element and a second port disposed on a side of the housing;
a second beam splitter of the at least one optical beam splitter is configured to selectably direct the second beam path to the second deflection element and a fourth port disposed on a side of the housing;
the first deflection element is configured to selectably direct the first assistant's beam path to a third port disposed offset on the back of the housing and, with the third deflection element, the first port;
the second deflection element is configured to selectably direct the second assistant's beam path to a fifth port disposed offset on the back of the housing and, with the third deflection element, the first port; and
the at least one assistant's tube is configured to slide along a semicircular sliding rail between the first, second, third, fourth and fifth ports.

14. The stereomicroscope as recited in claim 7 wherein the at least one optical beam splitter is capable of swiveling by 90°.

15. The stereomicroscope as recited in claim 7 wherein the at least one assistant's tube is detachably arranged on a port.

* * * * *